(12) United States Patent
Battlogg

(10) Patent No.: US 12,547,254 B2
(45) Date of Patent: Feb. 10, 2026

(54) CONTROL DEVICE AND COMPUTER MOUSE

(71) Applicant: INVENTUS Engineering GmbH, St. Anton i.M. (AT)

(72) Inventor: Stefan Battlogg, St. Anton i.M. (AT)

(73) Assignee: Inventus Engineering GmbH, St. Anton i.M. (AU)

( * ) Notice: Subject to any disclaimer, the term of this patent is extended or adjusted under 35 U.S.C. 154(b) by 742 days.

(21) Appl. No.: 17/923,670

(22) PCT Filed: May 6, 2021

(86) PCT No.: PCT/EP2021/062088
§ 371 (c)(1),
(2) Date: Nov. 7, 2022

(87) PCT Pub. No.: WO2021/224436
PCT Pub. Date: Nov. 11, 2021

(65) Prior Publication Data
US 2023/0236680 A1 Jul. 27, 2023

(30) Foreign Application Priority Data
May 6, 2020 (DE) ............. 10 2020 112 326.4

(51) Int. Cl.
*G06F 3/0354* (2013.01)
*G05G 1/08* (2006.01)
*G06F 3/0362* (2013.01)

(52) U.S. Cl.
CPC ........ *G06F 3/03543* (2013.01); *G06F 3/0362* (2013.01); *G05G 1/08* (2013.01)

(58) Field of Classification Search
CPC ...... G06F 3/03543; G06F 3/0362; G05G 1/08
See application file for complete search history.

(56) References Cited

U.S. PATENT DOCUMENTS

| | | | |
|---|---|---|---|
| 7,061,471 B2 * | 6/2006 | Bohn | G06F 3/0485 345/169 |
| 11,300,990 B2 | 4/2022 | Battlogg | |
| 11,322,324 B2 | 5/2022 | Wakuda et al. | |
| 11,989,361 B1 * | 5/2024 | Vlasov | G06F 3/03543 |
| 12,420,633 B2 * | 9/2025 | Walter | B60K 26/02 |

(Continued)

FOREIGN PATENT DOCUMENTS

| | | |
|---|---|---|
| CN | 107797680 A | 3/2018 |
| DE | 102015104927 A1 | 10/2016 |

(Continued)

*Primary Examiner* — Ariel A Balaoing
(74) *Attorney, Agent, or Firm* — Laurence A. Greenberg; Werner H. Stemer; Ralph E. Locher

(57) ABSTRACT

The invention relates to a control device with a stator unit fastened via a stator connection to a support body, and a rotor unit rotatable about the stator unit. The rotatability of the rotor unit about the stator unit can be influenced in a targeted manner by means of a braking device. For its rotatability about the stator unit, the rotor unit is mounted on the support body by means of at least one bearing unit of a bearing device, so that a force acting on the rotor unit from radially outside can be diverted via the bearing unit into the support body, bypassing the stator unit and the stator connection.

36 Claims, 8 Drawing Sheets

(56) References Cited

U.S. PATENT DOCUMENTS

| | | | |
|---|---|---|---|
| 2001/0052893 A1* | 12/2001 | Jolly | G06F 3/0338 345/156 |
| 2002/0057152 A1* | 5/2002 | Elferich | B60K 35/10 335/220 |
| 2003/0025673 A1 | 2/2003 | Ledbetter et al. | |
| 2004/0001075 A1 | 1/2004 | Balakrishnan et al. | |
| 2005/0237314 A1* | 10/2005 | Ryynanen | G06F 1/1613 345/184 |
| 2006/0012584 A1* | 1/2006 | Vassallo | G06F 3/016 345/184 |
| 2006/0033703 A1* | 2/2006 | Olien | G06F 3/0362 345/156 |
| 2006/0044271 A1* | 3/2006 | Anastas | G06F 3/016 345/163 |
| 2007/0146324 A1* | 6/2007 | Blandin | G06F 3/0362 345/163 |
| 2007/0188454 A1* | 8/2007 | O'Sullivan | G09G 5/08 345/163 |
| 2008/0210047 A1 | 9/2008 | Hallet | |
| 2011/0128135 A1* | 6/2011 | Periquet | F16F 9/535 340/407.2 |
| 2011/0227828 A1* | 9/2011 | Blandin | G06F 3/03543 345/163 |
| 2016/0224114 A1 | 8/2016 | Vanhelle et al. | |
| 2016/0378131 A1* | 12/2016 | Battlogg | F16H 59/0217 74/553 |
| 2017/0227980 A1 | 8/2017 | Hafez et al. | |
| 2018/0329446 A1* | 11/2018 | Schweer | G05G 5/06 |
| 2019/0179356 A1 | 6/2019 | Goto et al. | |
| 2019/0291286 A1 | 9/2019 | Adachi | |
| 2020/0355229 A1 | 11/2020 | Battlogg | |
| 2023/0241973 A1* | 8/2023 | Battlogg | B60K 35/55 188/267.2 |
| 2023/0280847 A1* | 9/2023 | Vlasov | G06F 3/03543 345/184 |
| 2024/0345669 A1* | 10/2024 | Vlasov | G06F 3/0362 |

FOREIGN PATENT DOCUMENTS

| | | |
|---|---|---|
| DE | 102018100390 A1 | 7/2019 |
| KR | 20200024351 A | 3/2020 |

\* cited by examiner

CONTROL DEVICE AND COMPUTER MOUSE

FIELD AND BACKGROUND OF THE INVENTION

The present invention relates to a control device comprising at least one stator unit which is fastened to at least one support body, and comprising at least one rotor unit which is rotatable about the stator unit. The rotatability of the rotor unit about the stator unit can be influenced/decelerated in a targeted manner by means of at least one braking device. The computer mouse is equipped with such a control device.

There is usually only very limited installation space available for accommodating the control device in an item of equipment. This is the case, for example, when the control device is used in a computer mouse as a mouse wheel or in other compact instruments. Despite the limited space, the mounting of the rotor unit must be able to absorb considerable forces, for example the pressure of a thumb or index finger during rotation. The braking device also requires a large amount of installation space in order to be able to reliably brake and even completely block (high torque) the (finger) forces that occur (tangential forces) and the resulting movement (rotation; torque). For such a control device, for example, the magnetorheological rotary damper known from DE 10 2015 104 927 A1 can be used, but it requires corresponding space for its accommodation.

SUMMARY OF THE INVENTION

By contrast, it is the object of the present invention to provide an improved control device. In particular, the control device shall require less installation space and preferably less axial installation space. Particularly preferably, a reliable/robust mounting and effective braking action shall also be possible.

This object is achieved by a control device having the features of the claims. A computer mouse according to the invention is the subject matter of the claims. A motor vehicle steering wheel according to the invention is the subject of the claims. Preferred developments of the invention are the subject of the dependent claims. Further advantages and features of the present invention will become apparent from the general description and the description of the exemplary embodiments.

The control device according to the invention comprises at least one support body and at least one stator unit which is fastened to the support body. The stator unit is fastened to the support body in particular by means of at least one stator connection. The control device comprises at least one rotor unit which is rotatable about the stator unit. The rotatability of the rotor unit about the stator unit can be influenced and, in particular, decelerated in a targeted manner by means of at least one braking device. In this case, for its rotatability about the stator unit, the rotor unit is mounted on the support body by means of at least one bearing unit of at least one bearing device. In particular, the rotor unit is thus mounted (at least with the bearing unit) independently of the stator unit. Preferably, a force acting on the rotor unit from radially outside can thus be diverted via the bearing unit into the support body, bypassing the stator unit and the stator connection.

The control device according to the invention offers many advantages. The mounting of the rotor unit on the support body offers a considerable advantage. As a result, the control device as a whole and especially the bearing device itself are considerably improved in terms of their requirement for (axial) installation space. The invention thus allows for reliable and loadable mounting even in particularly confined installation space conditions and, for example, in a computer mouse as a mouse wheel. A further advantage is that the arrangement and accommodation of the bearing unit can be designed more independently or with more degrees of freedom.

The invention therefore offers considerable advantages over control devices known from the prior art, in which the rotor unit is mounted on the stator unit and, for example, on its stator shaft. As a rule, in the prior art, usually at both axial ends, two bearings and, for example, roller bearings or plain bearings are pushed onto the stator shaft. The rotor unit is then supported on these bearings. The stator unit must then still be supported/received on the support body. It has been shown that this requires a particularly large amount of axial installation space so that the braking device and other components of the stator can be accommodated between the bearings. Efforts to reduce the installation space requirements, in this case especially the axial length, of the known control devices therefore usually provide narrower bearings or integrate the bearings into the braking device. Narrow bearings, however, have less bearing surface and therefore are only able to absorb fewer forces, which reduces service life. Integration into the braking device reduces its braking force. Generating braking force requires construction volume.

Due to the mounting of the rotor unit presented here, the stator unit and the stator connection do not experience any undesirable moment of force when pressing with a finger when operating the control device. In particular, the stator unit and the rotor unit are not subjected to an overturning moment, which would occur, for example, if the stator unit and the rotor unit were each mounted on one side and supported coaxially on one another between the bearing points. In the prior art, the stator shaft is usually subjected to substantial shear forces and bending moments. In the invention, such forces are dissipated without influencing the stator components or introducing an overturning moment. At the same time, this allows the installation space requirement to be considerably reduced. In the prior art, however, such surfaces or structures must have certain surfaces and cross sections in order to be durable in terms of strength and service life. This sometimes increases the installation space requirement (for example increase in the cross section), which is very disadvantageous in the case of computer mice and finger rollers, for example. In the case of a computer mouse wheel with haptic feedback, for example, a rotor diameter of approximately 13 mm, a shaft diameter of approximately 4 mm and an axial length of <20 mm with a braking torque of at least 50 mNm and at the same time a base torque of less than 5 mNm are required.

Another significant advantage is that in the invention—in contrast to prior art devices—no centering/positioning of the rotor relative to the stator takes place directly by way of the parts moving relative to each other. In the invention, the centering/positioning of the rotor unit and the stator unit can be performed independently of each other, since these components do not have to support each other. In the invention, the (radial) positioning of the stator relative to the rotor does not have to take place directly, but can take place, for example, by way of the support structure and/or the stator shaft.

In particular, the rotor unit is mounted by bypassing the stator unit. In particular, the bearing forces are introduced directly and/or indirectly from the rotor unit into the support body, bypassing the stator unit.

The stator connection comprises in particular at least one stator shaft or is designed as such. The stator shaft is designed in particular as an axle or as an axle-like extension which extends from the stator unit to the support body and is fastened there.

In particular, the stator shaft connects a magnetic-field-generating device to the support body. In particular, the stator unit is equipped with at least one magnetic-field-generating device. The magnetic-field-generating device comprises, for example, at least one electric coil and, in particular, at least one coil core.

In particular, the stator unit is only fastened to the support body on one side (in particular in the manner of a cantilever arm) by means of the stator connection. In particular, it is possible (at least notionally) to support and rotate the rotor unit as intended without the presence of the stator unit as provided for operation.

The stator unit comprises in particular at least one stator body and at least one stator shaft. The stator shaft extends in particular on one side or also on both sides from the stator body. In particular, the stator body is arranged on the stator shaft. In particular, an axial centerline of the stator unit extends centrally through the stator shaft. In particular, the stator body is at least partially enclosed by the rotor unit. In particular, at least one field generating device of the braking device is arranged in the stator body.

In particular, the rotor unit is mounted (and in particular also supported) on the support body radially outwardly by means of the bearing unit. This results in a larger friction radius or friction distance for the mounting than in the known solutions with a mounting located radially inside the rotor unit. However, the effects of the larger friction radius can be advantageously compensated in corresponding embodiments of the invention, for example by a particularly smooth-running mounting or by a partially circumferential mounting. Therefore, overall, the invention offers many advantages over known control devices.

Preferably, the bearing unit is arranged on a radial outer side of the rotor unit. In particular, the bearing unit is arranged radially on the outside of the rotor unit.

Preferably, the rotor unit is at least partially arranged between the bearing unit and the stator unit. In particular, the rotor unit is arranged radially between the bearing unit and the stator unit. In particular, the rotor unit extends at least partially between the bearing unit and the stator unit.

In a preferred embodiment, the bearing unit surrounds the rotor unit only partially radially. In particular, the bearing unit does not surround the rotor unit fully radially. If only just over 180° of the circumference is supported, the remaining circumferential region remains open and can be utilized, for example in the case of use as a mouse wheel, for the arrangement of the left and right mouse buttons thereabove. Also, when installed as a thumb roller, for example in a steering wheel spoke of a motor vehicle steering wheel, only a smaller axial length of the rotor should protrude from the spoke as a circular segment, in particular for design reasons, and the remaining length including bearing points must be covered in particular. This is possible in particular by design (only) if the bearing unit only partially surrounds the rotor unit. For example, the increase in the friction radius caused by the externally located mounting can thus be counteracted. In addition, this provides a particularly compact and at the same time reliable mounting, since the bearing surfaces also become larger due to the larger circumference. However, the bearing unit can also surround the rotor unit radially fully circumferentially.

It is advantageous and preferred that the bearing unit radially surrounds the rotor unit at least in portions in a form-fitting manner. In particular, the bearing unit surrounds the rotor unit in such a way that the rotor unit cannot leave the bearing unit at least in the radial direction. As a result, the rotor unit is securely and firmly held, even if no fully circumferential radial mounting is provided. The bearing unit may comprise two or more spaced-apart bearing points arranged to radially surround the rotor unit in a form-fitting manner. In particular, the bearing unit surrounds the rotor unit by less than 360° and in particular by more than 180°. Other angles for the radial enclosure are also possible.

In particular, the rotor unit is mounted on the support body only with a radial portion of its circumference. In particular, the radial portion is less than 360° and in particular more than 180°. The radial portion can also be less than 180°. In particular, the radial portion is formed such that an area of the rotor unit intended for operation with a finger is exposed.

In particular, the rotor unit is radially supported only partially circumferentially. In particular, the rotor unit is not radially supported fully circumferentially. In particular, the rotor unit is mounted over less than 360° and in particular over more than 180°. The rotor unit can also be mounted over less than 180°. The rotor unit can also be radially supported fully circumferentially.

In particular, the rotor unit is not mounted (by means of the at least one bearing unit of the at least one bearing device) on the stator unit and/or preferably only on the support body.

It is possible and advantageous that the rotor unit is axially displaceably mounted (at least by means of the at least one bearing unit) on the support body.

The at least one bearing unit can provide at least one fixed bearing for blocking an axial movability of the rotor unit. It is also possible that the at least one bearing unit is assigned at least one travel limitation means for an axial movability of the rotor unit in at least one direction. Such a travel limitation means comprises in particular at least one stop or is formed as such. The stop can be provided on one side or both sides of the bearing unit.

In all embodiments, it is particularly preferred that the stator unit and the rotor unit delimit at least one chamber that is sealed outwardly. In particular, at least one braking medium of the braking device is arranged in the chamber. The sealing of the chamber is provided in particular for the braking medium. In particular, the braking device comprises the at least one chamber.

It is provided and advantageous that the stator unit (at least with the stator shaft) extends out of the chamber and/or the rotor unit. In particular, the stator unit can be moved partially out of the chamber and/or partially into the chamber. In particular, a volume of the chamber available for the braking medium can be changed by moving the stator unit out or in. In particular, this provides compensation for temperature-related and/or leakage-related and/or assembly/filling-related changes in the volume of the braking medium.

In particular, the stator unit and the rotor unit are axially displaceable relative to each other. In particular, the stator unit can be moved out of the chamber or into the chamber by axial displacement relative to the rotor unit.

In particular, the stator unit is arranged axially displaceably on the support body. In particular, the stator unit is arranged in a rotationally fixed manner on the support body so that, in particular, a diversion of a moment of force into the support body is possible. Preferably, at least the stator shaft of the stator unit is arranged in this way. The stator unit can also be arranged in a fixed or stationary manner on the support body. In particular, the rotor unit is arranged here in a stationary manner on the support body in the axial direction. The rotor unit can also be mounted on the support body so as to be displaceable in the axial direction.

In a particularly preferred and advantageous embodiment, the stator unit is arranged and in particular fastened to the support body by means of at least one shaft holder. Preferably, at least the stator shaft is arranged in this way. In particular, the stator unit is arranged in a rotationally fixed manner on the shaft holder. The stator unit can be arranged in a stationary or axially displaceable manner on the shaft holder. In particular, the shaft holder is arranged on the support body in a rotationally fixed manner. The shaft holder can be arranged in a stationary or axially displaceable manner on the support body.

In a preferred and advantageous development, the stator unit is arranged in a rotationally fixed and, in particular, fixed or stationary manner on the shaft holder. In particular, the shaft holder is arranged so as to be axially displaceable relative to the support body. In particular, the shaft holder surrounds the rotor unit radially at least in portions. For example, the shaft holder surrounds the rotor unit in a ring-like or sleeve-like manner. Such a development allows an axial displacement, for example for a volume compensation, and at the same time provides an advantageous measure against tilting of the stator unit relative to the rotor unit.

The inner side of the shaft holder at least partially encloses in particular the outer side of the rotor unit. The shaft holder and the rotor unit are in particular arranged concentrically to each other at least in portions. In particular, the shaft holder is on the outside and the rotor unit is in the center. In particular, the shaft holder and the rotor unit are axially displaceable relative to each other. In particular, the rotor unit is mounted rotatably relative to the shaft holder.

In advantageous developments, the rotor unit can be mounted axially displaceably on the support body. This is advantageous, for example, if the axial displacement of the rotor unit is not undesirable, for example in the context of a volume compensation. For example, the axial displacement of a control wheel in a computer mouse can be barely perceptible in the context of volume compensation. In such an embodiment, the stator unit is fastened to the support body in particular in a stationary manner. If an axial displacement of the rotor unit is undesirable, the previously described embodiment with the axially displaceable shaft holder, for example, offers many advantages. Then the rotor unit can be mounted axially in a stationary or stable manner on the support body.

It is possible and preferred that the stator unit is only fastened to the support body on one side. In particular, the stator unit is fastened to the support body only with an end portion of the stator shaft. In particular, the end portion of the stator shaft is then fastened to the shaft holder. However, it is also possible that the stator unit is fastened to the support body on both sides. For example, the stator shaft is then fastened to the support body with one end portion in each case.

It is advantageous and preferred that the control device comprises at least one alignment device, which serves to align an axial center axis of the stator unit (in particular of the stator shaft) relative to an axial center axis or axis of rotation of the rotor unit. In particular, the alignment device is suitable and designed to align the center axis of the stator unit parallel to the center axis of the rotor unit and/or in a manner overlapping therewith. In particular, the alignment device is suitable and designed to arrange the stator unit concentrically to the rotor unit. In particular, the stator unit runs concentrically in the rotor unit.

Such a (concentric) alignment is particularly advantageous or necessary, since even small misalignments between the stator unit and rotor unit (stator and rotor center axis) can lead to increased friction in the rotor unit, because the seal (for example radial seal; quad ring; O-ring; lip seal) is pressed or squeezed more strongly in one direction. An even greater eccentricity between the rotor unit and stator body can additionally lead to leakage (gap between shaft and seal, especially under movement/pressure) for the braking medium. In addition, with particularly high requirements for smooth-running operation (for example, only a few millinewton meters without active braking=idle torque or base torque), even the smallest misalignments are haptically disadvantageously noticeable. Free rotation, useful for fast page scrolling, of a mouse wheel (free-wheeling or free-spinning) after the user has nudged it is then no longer possible. With a conventional, radially inner mounting of the rotor unit on the stator shaft, the alignment of these components usually already results from their pushing onto the bearings.

In particular, at least the stator shaft of the stator unit can be aligned on or in the shaft holder by means of the alignment device. It is also possible that the stator shaft can be aligned on or in the support body by means of the alignment device.

In a preferred embodiment of the alignment device, the stator shaft comprises at least one conical alignment portion. The alignment portion can be arranged or is arranged in and/or on a corresponding conical alignment part of the shaft holder and/or of the support body. For example, the stator shaft has a conical outer side. For example, the alignment part then comprises a conically shaped recess in the shaft holder or support body. Even with different manufacturing tolerances of the individual parts, this allows an uncomplicated and at the same time particularly reliable (concentric) alignment without play between the parts.

Preferably, by means of the alignment device, the shaft holder can be aligned on or in the support body. Preferably, the rotor unit can be aligned on or in the shaft holder by means of the alignment device. For example, the alignment device for this purpose comprises a part of the shaft holder, which grips the rotor unit with a precise fit.

In an advantageous embodiment of the alignment device, the shaft holder is at least partially symmetrical and in particular axis-symmetrical (with respect to the center axis). In particular, an axial center axis of a portion of the shaft holder which radially surrounds the rotor unit and an axial center axis of a portion of the shaft holder to which the stator unit is fastened are thus arranged in parallel and preferably overlapping with each other. Such a shaft holder is structurally uncomplicated and at the same time provides reliable alignment of the rotor unit and stator unit. This symmetrical embodiment also allows the alignment device to be manufactured particularly easily and at the same time with a high degree of accuracy, for example by means of concentric bores in the shaft holder.

The rotor unit in particular is also mounted on the portion of the shaft holder. The portion of the shaft holder comprises in particular the alignment part. In particular, the shaft holder is formed here in one piece. This allows a particularly short tolerance chain since both axial center axes are on one component.

Preferably, the rotor unit is rotatably mounted on a portion of the shaft holder that radially surrounds the rotor unit. This offers an advantageous functional integration of the mounting and of the alignment as well as the possibility for volume compensation. In particular, the rotor unit is mounted on the support body via the shaft holder. In particular, the rotor unit is mounted independently of the stator unit via the shaft holder. In particular, the rotor unit is mounted on the portion of the shaft holder by means of the at least one bearing unit. In particular, the rotor unit is mounted on an inner side of the portion of the shaft holder and/or radially inwardly on the shaft holder.

Preferably, a portion of the shaft holder, which radially surrounds the rotor unit, is arranged with its outer side at least partially on or in the support body and is preferably arranged in a rotationally fixed manner. In this case, the portion of the shaft holder is preferably arranged axially displaceably on or in the support body. The portion can also be arranged in a stationary manner on the support body.

In all embodiments, it is particularly preferred that a deceleration/braking torque occurring during a deceleration of the rotary motion of the rotor unit can be at least partially diverted into the support body via the stator unit. In particular, the stator unit is fastened in a rotationally fixed manner to the support body. In particular, a torque exerted on the rotor unit during operation of the control device can be converted by means of the braking device into a deceleration torque acting on the stator unit. The deceleration torque acting on the stator unit can then be at least partially diverted into the support body. In particular with regard to the deceleration torque, the stator unit can be supported or is supported on the support body.

It is possible and preferred that a pressure load exerted on the rotor unit during a control operation can be at least partially diverted into the support body via the bearing unit, bypassing the stator unit. This is particularly advantageous, since the bearing unit not only provides support for the rotary movement, but also introduces load forces for actuation. This can be the pressure of a finger, for example.

In all embodiments it is possible and advantageous that the bearing device comprises at least one further (or at least one second) bearing unit. In particular, the bearing device comprises at least two bearing units, namely at least one first bearing unit and at least one further or second bearing unit. The bearing device may also comprise at least two or at least three or a plurality of bearing units and/or further bearing units.

In particular, the rotor unit is also mounted on the support body by means of the at least one further bearing unit. In particular, the rotor unit is also mounted independently of the stator unit at least on the further bearing unit. In particular, the further bearing unit is at least partially designed like the previously described bearing unit. In particular, the at least one further bearing unit serves to support the rotor unit radially outwardly on the support body.

In particular, the bearing unit and the further bearing unit are arranged eccentrically and, in particular, endwise on the rotor unit. In particular, at least one bearing unit is arranged on at least one end portion of the rotor unit in each case. The bearing units can be arranged on portions with the same or different outer diameters of the rotor unit.

In a preferred and advantageous embodiment, the at least two bearing units of the bearing device are arranged axially spaced from each other. Preferably, the rotor unit is mounted radially outwardly on the support body for the rotatability of the rotor unit about the stator unit by means of the at least two bearing units. In particular, this means that the bearing units provide a mounting for the rotor unit that is independent (in particular completely) of the stator unit and/or the stator connection.

In particular, the at least two bearing units allow a force acting on the rotor unit from radially outwardly to be diverted into the support body at two spaced-apart positions, bypassing the stator unit and the stator connection. In particular, the bearing units are spaced apart from each other in such a way that the rotor unit does not experience any (undesirable) overturning moment during intended operation. In particular, the bearing units are arranged at opposite axial end regions of the rotor unit.

In one possible and advantageous embodiment, the bearing device is designed for one-sided clamping of the rotor unit to the support body. In particular, the bearing device is suitable and designed to support the rotor unit on one side. In particular, the bearing device is suitable and designed to enclose the rotor unit at a circumferential angle on a radial outer side such that the rotor unit is secured against pivoting about the clamping point. In particular, the bearing device is suitable and designed to absorb a radial force and a torque caused by the actuation and acting from the rotor unit. Such a mounting can also be referred to as a flying mounting.

In particular, the one-sided clamping is performed by means of at least one bearing unit. For this purpose, the at least one bearing unit is designed, for example, as a double-row or multi-row bearing. It is also possible that a double-row or multi-row arrangement of at least two bearing units is provided for this purpose. In particular, the at least one bearing unit is designed as an angular contact bearing or tapered roller bearing.

In all embodiments, it is also preferred and advantageous that the braking device is magnetorheological. In particular, the braking device comprises at least one controllable magnetic-field-generating device and, for example, an electrocoil. In particular, the braking device comprises at least one magnetorheological medium (MR fluid) as braking medium. In particular, the magnetorheological medium can be influenced by means of the magnetic-field-generating device. In particular, the magnetorheological medium can be influenced in such a way that the rotatability of the rotor unit about the stator unit can be decelerated by means of the medium. In particular, at least one (outwardly sealed) space (for example gap and/or channel) is arranged between the rotor unit and the stator unit for receiving the magnetorheological medium. The rotational resistance (torque) of the rotor unit about the stator unit is, in particular, adaptively variable by means of the medium. In particular, the control device is designed for magnetorheological deceleration of the rotary movement of the rotor unit within the scope of a control operation. Multiple rapid deceleration and rapid release (ripple) is also possible. In particular, the rotatability of the rotor unit can be decelerated by means of the braking device at least in dependence of a sensor-detected angle of rotation of the rotor unit. For this purpose, the braking device comprises in particular at least one sensor means (for example magnetic ring, Hall sensor, etc.). The braking device and/or the sensor can also be assigned electronics including control means (control algorithm; software).

The magnetorheological medium comprises, in particular, particles that can be influenced in a targeted manner by means of a magnetic field. In particular, the particles are contained in a carrier medium. In particular, the carrier medium is provided by ambient air and/or a fluid that differs from the ambient air. The carrier medium may also differ from the ambient air at least by pressure. For example, the particles may be subjected to a negative pressure or may be contained under a vacuum in a fluid or may also be contained in the ambient air. In particular, a space for the magnetorheological medium is arranged between the rotor unit and the stator unit and is adapted to the medium in question.

In particular, ferromagnetic and/or ferrimagnetic and/or superparamagnetic particles and preferably at least particles of carbonyl iron powder are provided. Particularly advantageously, a magnetorheological medium which is provided from carbonyl iron powder in ambient air can be used in the control device shown here. Auxiliary materials can also be added, which in particular improve lubrication. In particular, the particles have a distribution of particle size between one and twenty micrometers. Smaller (<1 micrometer) to very small (a few nanometers, typically 5 to 10 nanometers) or larger particles of thirty, forty and fifty micrometers are also possible.

In particular, the control device comprises at least one control element that can be moved by means of at least one finger to perform an input or operation. Preferably, a movement of the control element can be converted into a rotary movement of the rotor unit. In particular, a resistance to movement for the movability of the control element can be adjusted in a targeted manner by influencing the rotatability of the rotor unit (mechanically) coupled to the control element by means of the braking device. In particular, the control element is designed as a control wheel. It is also possible that the control element is designed as a control lever.

In particular, the control wheel is connected to the rotor unit for conjoint rotation (so that the two can only rotate together). The rotor unit preferably comprises at least one control wheel or is designed as such. The control wheel is preferably designed as a finger roller (may also be referred to as a control roller) and particularly preferably as a mouse wheel. A finger roller is particularly also understood to mean a thumb roller. In particular, this is because they are installed, for example, in steering wheels or steering wheel spokes of motor vehicles and are moved with the thumb. The control wheel can also be a rotary knob or the like arranged vertically or horizontally. In this case, the control device is designed in particular as a finger roller or a computer mouse. The applicant reserves the right to claim a finger roller with a control device.

In particular, the control wheel is connected to the rotor unit for conjoint rotation. For example, the control wheel and the rotor unit can be arranged coaxially with respect to one another, wherein the control wheel is located in particular radially outwardly. For example, the control wheel is designed as an annular body which is pushed onto the rotor unit and (fixedly) connected thereto. The control wheel can be formed or connected to the rotor unit in one piece. For example, the finger can then be placed directly on a portion of the rotor unit provided for this purpose.

In the case of a finger roller, the invention offers a particularly large number of advantages, since, on the one hand, these generally have to be very small and compact in design and, on the other hand, at the same time experience quite high pressure loads when actuated (for example, when the thumb is pressed while the other fingers are gripping the steering wheel). Similarly, a mouse wheel also requires particularly compact dimensions, while the index finger, for example, can exert a very powerful moment on the rotor unit, which the construction must be able to withstand safely.

In particular, the control lever can be pivoted about at least one axis. In particular, the control lever is coupled to the rotor unit by means of at least one gearing arrangement. In particular, a pivoting movement of the control lever can be converted into a rotary movement of the rotor unit by means of the gearing arrangement.

In particular, the control lever can be moved with at least one finger. The control lever can also be moved by being grasped by several fingers or by the hand. The control lever can be designed as a joystick lever or also as a game controller lever or game pad lever. Then, the control device is designed in particular as a joystick or game controller or gamepad. The applicant reserves the right to claim such a control device.

The computer mouse (or control instrument for a computer) according to the invention comprises at least one control device as previously described. The computer mouse comprises at least one mouse wheel and in particular at least one mouse body. The mouse wheel is in particular rotatably mounted on the mouse body.

In particular, the mouse wheel is provided here by the rotor unit. In particular, the mouse body is provided by the support body. The control device may also be associated with a game controller, smart device (smartphone, iPad, laptop, etc.), computer keyboard, remote control, joystick, industrial control instrument or household appliances or the like. The applicant reserves the right to claim such an item of equipment comprising a control device.

The motor vehicle steering wheel according to the invention comprises at least one control device as previously described. In particular, the control device is integrated into the motor vehicle steering wheel in such a way that operation is possible while the steering wheel is being held.

In the context of the present invention, a deceleration is also understood to mean a blocking (blocking=high braking torque). Blocking is understood to mean in particular that no further rotation in at least one direction of rotation and/or in both (all) directions of rotation in accordance with operation can take place with a manual force to be applied in accordance with operation. In particular, the rotatability of the rotor unit can also be released by means of the braking device. In the context of the present invention, a release of the rotatability (free-wheeling; free-spinning) is understood in particular to mean that only an operational base torque of the braking device is present, without an additionally switched-on magnetorheological deceleration, for example by energizing the field generation device. When the rotatability is released, the magnetorheological braking device is inactive, in particular, so that no field is generated to actively influence the magnetorheological medium of the braking device. In the invention, the base torque can be less than 10 mNm and in particular less than 5 mNm and particularly preferably at most 1 mNm (0.001 Nm), which is extremely low.

The bearing unit comprises in particular at least one plain bearing and/or at least one rolling bearing or is designed as such. The bearing unit may also comprise at least one other suitable bearing type or may be designed as such. In particular, the bearing unit comprises at least one bearing point. The bearing unit may comprise at least two or at least three or a plurality of bearing points.

In the context of the present invention, positional indications and in particular the indications "radially" and "axially" relate in particular to an axis of rotation of the rotor unit. In the context of the present invention, a rotationally fixed arrangement refers in particular to a rotational movement about an axis of rotation about which the rotor unit is also rotatable.

Further advantages and features of the present invention will become apparent from the description of the exemplary embodiments, which are explained below with reference to the accompanying figures.

DETAILED DESCRIPTION OF THE INVENTION

Figure 1:
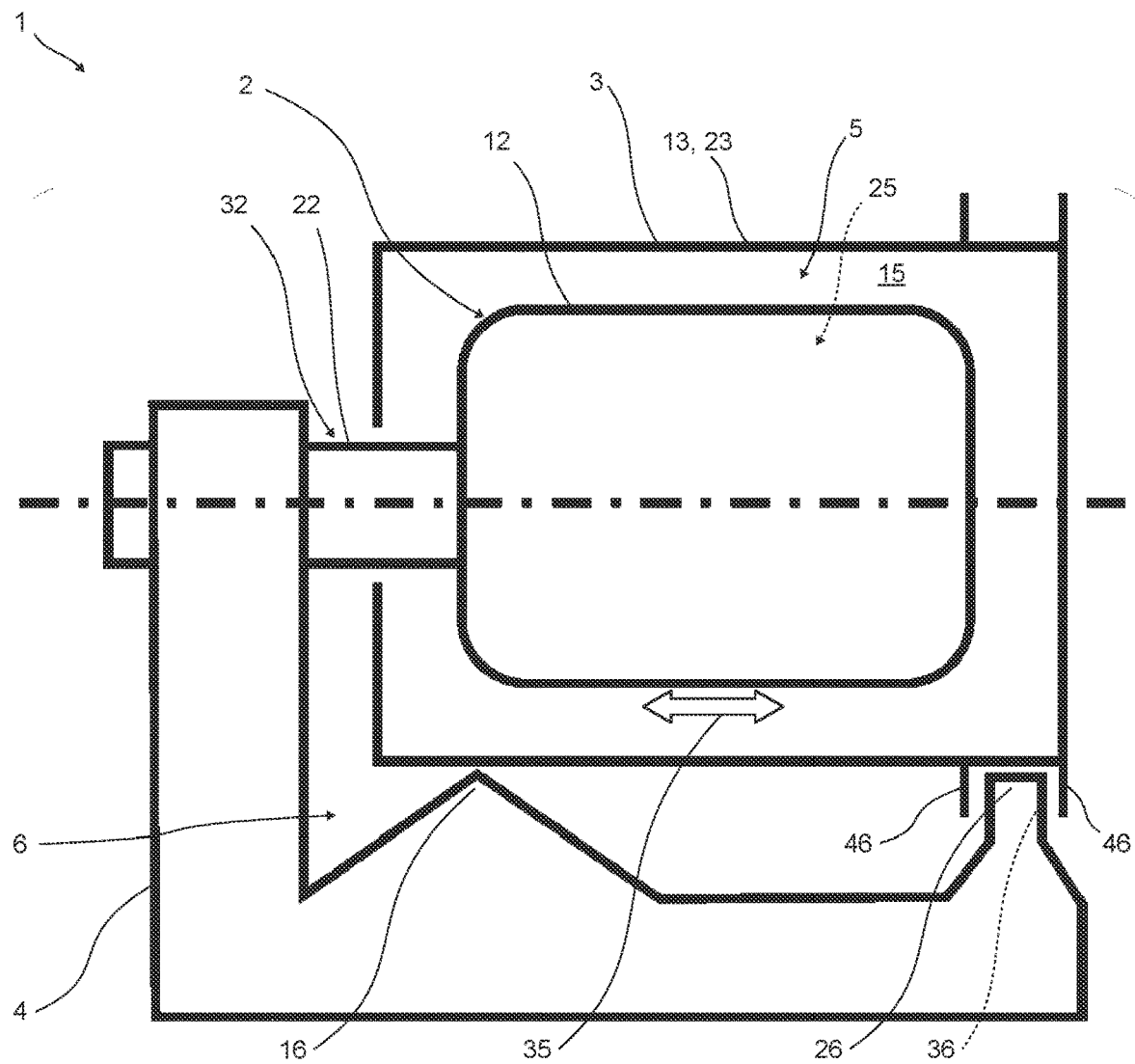
FIG. 1 shows a highly schematized illustration of a control device according to the invention in a sectional side view.
Figure 1A:
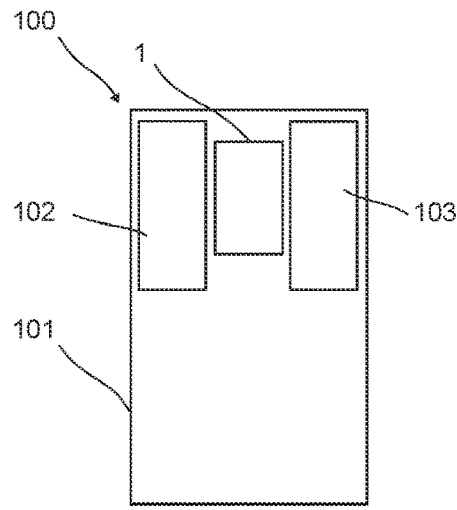
FIG. 1a shows a highly schematized illustration of a computer mouse comprising the control device according to the invention.

FIG. 1 shows a control device 1 according to the invention, which can be used, for example, in a computer mouse 100 as shown in FIG. 1a. The control device 1 comprises a rotor unit 3 designed here as a control wheel 13 and, for example, a mouse wheel 23. Operation is thus effected at least by rotating the rotor unit 3.

The rotor unit 3 is rotatably mounted around a stator unit 2. The stator unit 2 here comprises a stator body 12 and a stator shaft 22 serving as a stator connection 32. The axis of rotation of the rotor unit 3 is shown here by a dot-and-dash line. The axis of rotation here also corresponds to an axial center axis of the stator unit 2 and the rotor unit 3.

The stator unit 2 is connected to a support body 4. The support body 4 may be, for example, a mouse body 101 of the computer mouse 100 of FIG. 1a. Two mouse buttons 102, 103 are shown here on the mouse body 101 to the left and right of the mouse wheel 23.

The rotary motion or rotatability of the rotor unit 3 about the stator unit 2 can be decelerated here in a targeted manner by means of a magnetorheologically designed braking device 5. The braking device 5 uses a magnetic-field-generating device 25, not shown in greater detail here, and, for example, an electric coil to generate a magnetic field which acts on a magnetorheological medium (MR fluid) as the braking medium. This leads to a local and strong cross-linking of magnetically polarizable particles, and thus an increase in the transmittable shear stress in the braking medium.

The braking device 5 thus allows a targeted deceleration (braking) and even complete blocking (high braking torque) of the rotary motion. The braking device 5 can thus provide haptic feedback during the rotary movement of the rotor unit 3, for example by means of a correspondingly perceptible pattern (ripple) or by means of dynamically adjustable stops.

In order to monitor the rotary position of the rotor unit 3 and to be able to use it to control the braking device 5, a sensor device is provided, which is not shown in greater detail here.

The braking medium is contained in a chamber 15 which is sealed off outwardly. The chamber 15 is delimited here by the rotor unit 3 and the stator unit 2.

The braking medium here is provided, for example, by carbonyl iron powder in ambient air. A magnetorheological fluid can also be provided as the medium and comprises, for example, an oil as the carrier fluid, in which ferromagnetic particles (for example carbonyl iron, ferrofluids, etc.) and/or ferromagnetic particles are present, for example. Superparamagnetic particles with low hysteresis are also possible. For example glycol, grease, silicone, water, wax and viscous or low viscous substances can be used as carrier medium without being limited thereto. The carrier medium can also be gaseous or/and a gas mixture or the carrier medium can be relinquished (vacuum, air, etc.). In this case, only particles that can be influenced by the magnetic field (for example carbonyl iron) are filled into the effective gap or chamber 15. Mixing with other particles—preferably having lubricating properties—such as graphite, molybdenum, plastics particles and polymer materials, is possible. A combination of the above (for example carbonyl iron powder plus graphite plus air) is also possible.

The particles are, for example, carbonyl iron powder with spherical microparticles, wherein the size distribution and shape of the particles depends on the specific application. Specifically, a distribution of the particle size between one and twenty micrometers is preferred, wherein, however, smaller (<1 micrometer) to very small (a few nanometers, typically 5 to 10 nanometers) or larger particles of thirty, forty and fifty micrometers are also possible. Depending on the application, the particle size can also be significantly larger and may even enter the millimeter range (particle spheres). The particles can also have a special coating/sheath (titanium coating, ceramic, carbon sheath, polymer coating, etc.) so that they are better able to withstand or are stabilized against the high pressure loads that occur, for example, depending on the application. The particles can also have a coating against corrosion or electrical conduction. For this application, the magnetorheological particles can be made not only of carbonyl iron powder (pure iron; iron pentacarbonyl, etc.) but also of special iron (harder steel) or other special materials (magnetite, cobalt, etc.), or a combination thereof.

The rotor unit 3 is held here (only) on the support body 4 (for diverting the reaction torque generated by braking). As a result, the axial dimensions of the control device 1 can be considerably reduced, which is of great advantage, for example, for installation in the computer mouse 100. In addition, a mounting of the rotor unit 3 independent of the stator unit 2 is provided here. Thus, the bearing forces and pressure loads can be diverted directly into the support body 4 in the event of rotation by a finger, bypassing the stator unit 2. The stator unit experiences only the reaction torque and no bearing or radial forces, allowing the stator shaft 22 to be thinner and thus save space. Overall, the result is a particularly compact and robust as well as haptically precise control.

For mounting the rotor unit 3, a bearing device 6 comprising a bearing unit 16 and a further bearing unit 26 is provided here. Via the bearing units 16, 26, the rotor unit 3 is mounted or supported radially outwardly on the support body 4. For this purpose, the bearing units 16, 26 are arranged here on the radial outer side of the rotor unit 3.

In the region of the further bearing unit 26, travel limitation means 46 are arranged on the rotor unit 3 here. This allows an axial displacement of the rotor unit 3 by a defined distance. The travel limitation means 46 can also be arranged in such a way that the axial movability is blocked.

If an axial movability of the rotor unit 3 relative to the support body 4 is undesirable, one or both bearing units 16, 26 can also be designed as a fixed bearing 36. Here, for example, the further bearing unit 26 can be designed as a fixed bearing 36.

To allow or compensate for temperature-related or leakage-related changes in the volume of the braking medium in the chamber 15, the volume of chamber 15 can be adjusted. For this purpose, the rotor unit 3 and the stator unit 2 are designed here to be axially displaceable relative to each other. The movement for such a volume compensation 35 is sketched here by a double arrow.

In the case of a volume compensation 35, the stator shaft 22 is here pushed out of the chamber 15 or pushed into the chamber 15. For this purpose, the stator shaft 22 is received here on the support body 4 axially displaceably. However, so that the deceleration torque can be diverted into the support body 4 in the event of a deceleration of the rotary movement, the stator shaft 22 is also connected to the support body 4 in a rotationally fixed manner.

Figure 2:
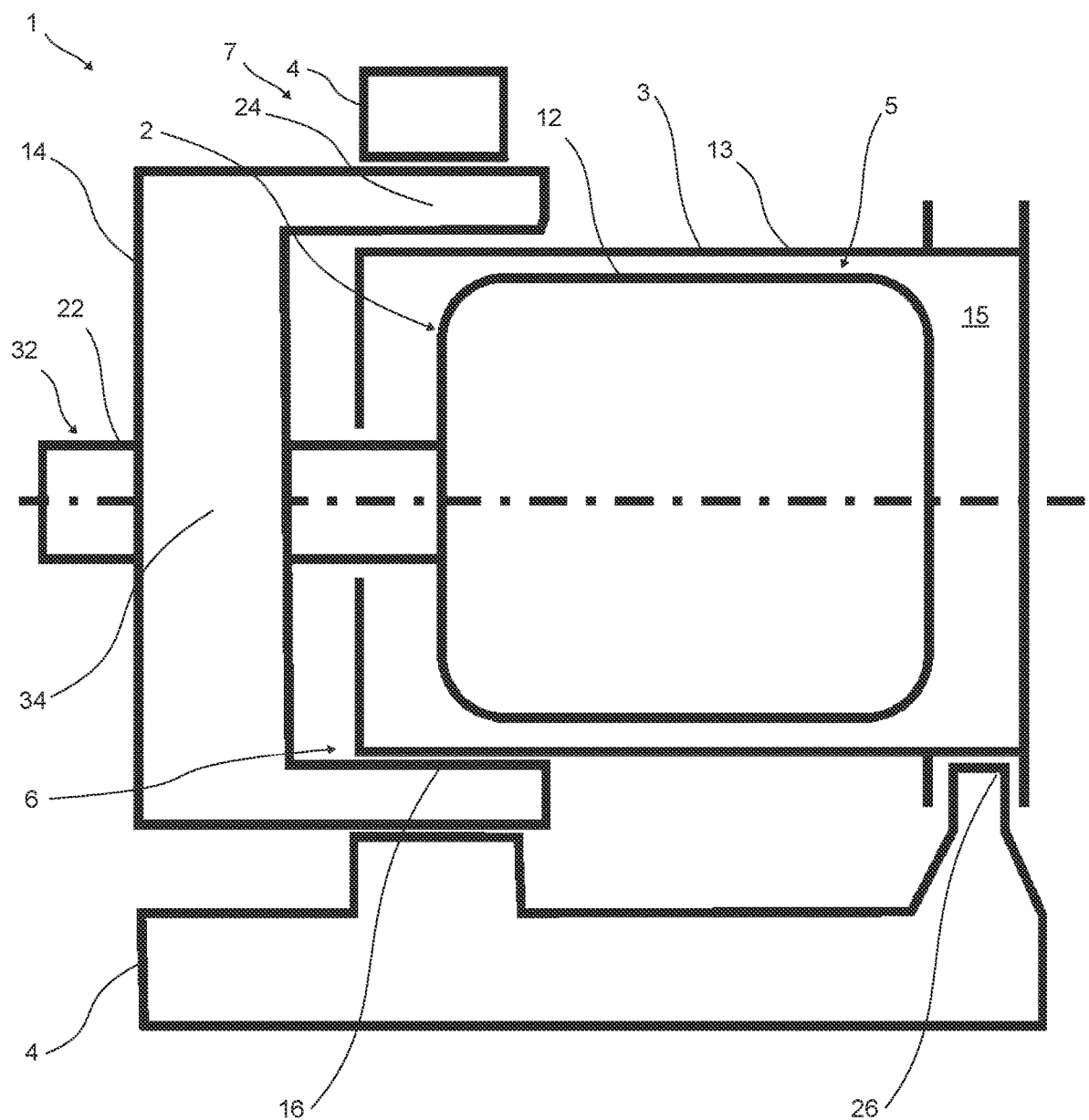
FIGS. 2-5 shows purely schematic illustrations of further embodiments of the control device in sectional side views.

FIG. 2 shows a development of the previously presented control device 1. Here, the stator unit 2 is connected to the support body 4 by a shaft holder 14. The shaft holder 14 is arranged axially displaceably on the support body 4. The stator unit 2, on the other hand, is fastened to the shaft holder 14 in a rotationally fixed and axially immovable manner.

As a result, the stator unit 2 moves together with the shaft holder 14 relative to the support body 4 during a volume compensation. Due to the shaft holder 14 and its correspondingly large radius, the axial movement here can be supported over a larger area (large surfaces; large distances), resulting in an improved axial guidance and alignment overall.

Here, a portion 24 of the shaft holder 14 surrounds the outer side of the rotor unit 3 in portions. The bearing unit 16 is arranged on the shaft holder 14 so that the rotor unit 3 is mounted on the support body 4 via the shaft holder 14. This also improves the mounting and axial displaceability and alignment of the components.

The control device 1 here comprises an alignment device 7 for aligning the axial center axis of the stator unit 2 relative to the axial center axis or the axis of rotation of the rotor unit 3. For the alignment device 7, the shaft holder 14 here is designed to be axis-symmetrical. The portion 24 of the shaft holder 14 which radially surrounds the rotor unit 3 and on which the bearing unit 16 is also arranged and a portion 34 of the shaft holder 14 thus have a common axial center axis. The portion 34 is used here for fastening the stator shaft 22.

As a result, the shaft holder 14 here allows precise concentric alignment of the rotor unit 3 and stator unit 2, and at the same time is also aligned with respect to the support body 4. For example, such an alignment device 7 can be provided in that the shaft holder 14 is formed as a rotary part with a larger centric bore for the portion 24 and a smaller centric bore for the portion 34.

Figure 3:
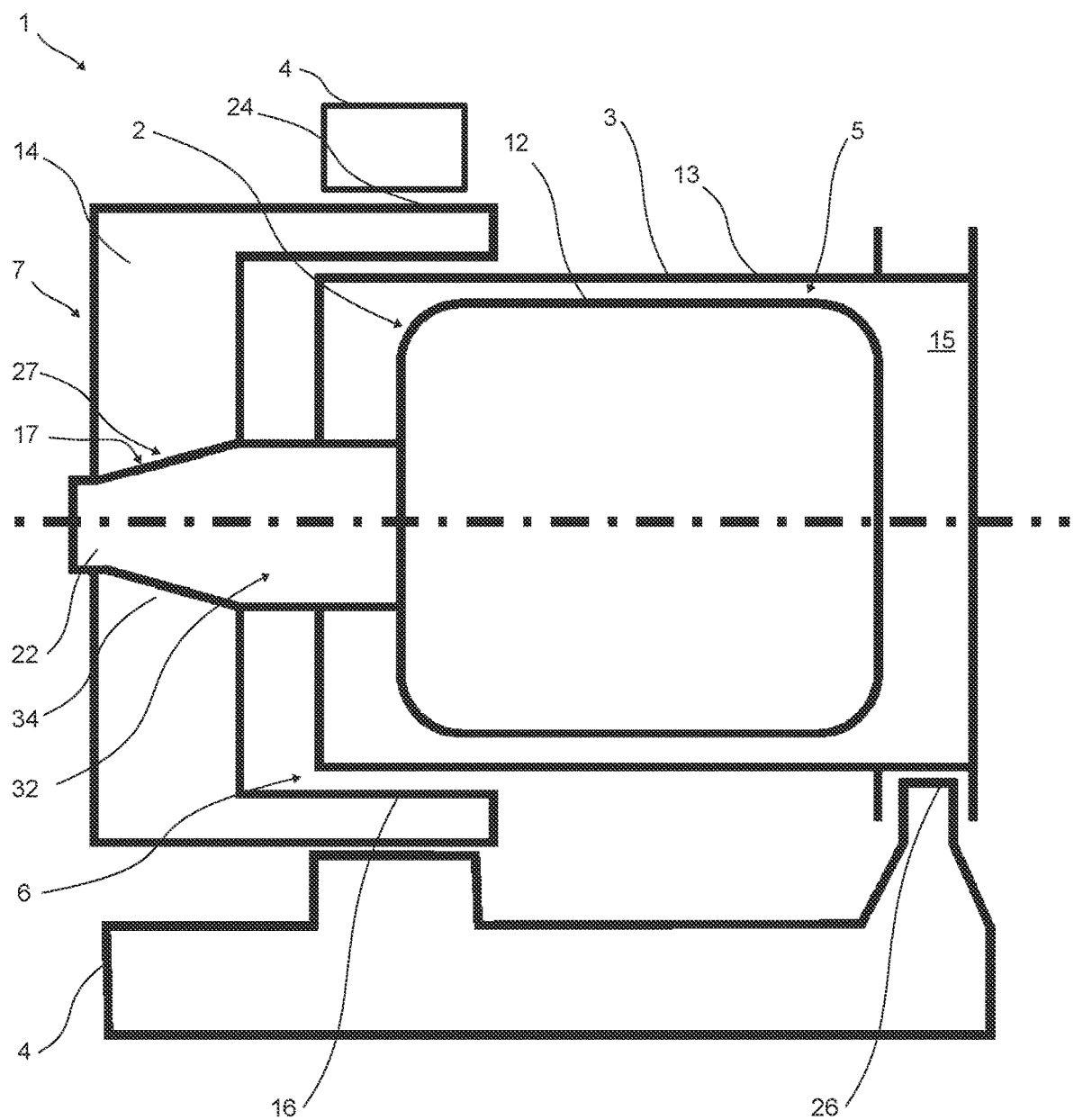

FIG. 3 shows the control device 1 presented with reference to FIG. 2 with an extended alignment device 7, with which an even more precise alignment of the stator shaft 22 on or in the shaft holder 14 is achieved. For this purpose, the stator shaft 22 comprises a conical alignment portion 17. The alignment portion 17 is arranged in a corresponding conical alignment part 27 of the shaft holder 14 and, for example, a conical recess. As a result, the stator unit 2 is optimally aligned (free of play, concentrically) when it is joined to the shaft holder 14.

The stator shaft 22 may also be aligned in the shaft holder 14 by a tapered collet. Additionally or alternatively, the stator shaft 22 can be screwed or otherwise fixed in shaft holder 14 in a frictionally engaged or form-fitting manner. A fixation by integral bonding is also possible, for example by (ultrasonic) welding or adhesive bonding.

Figure 4:
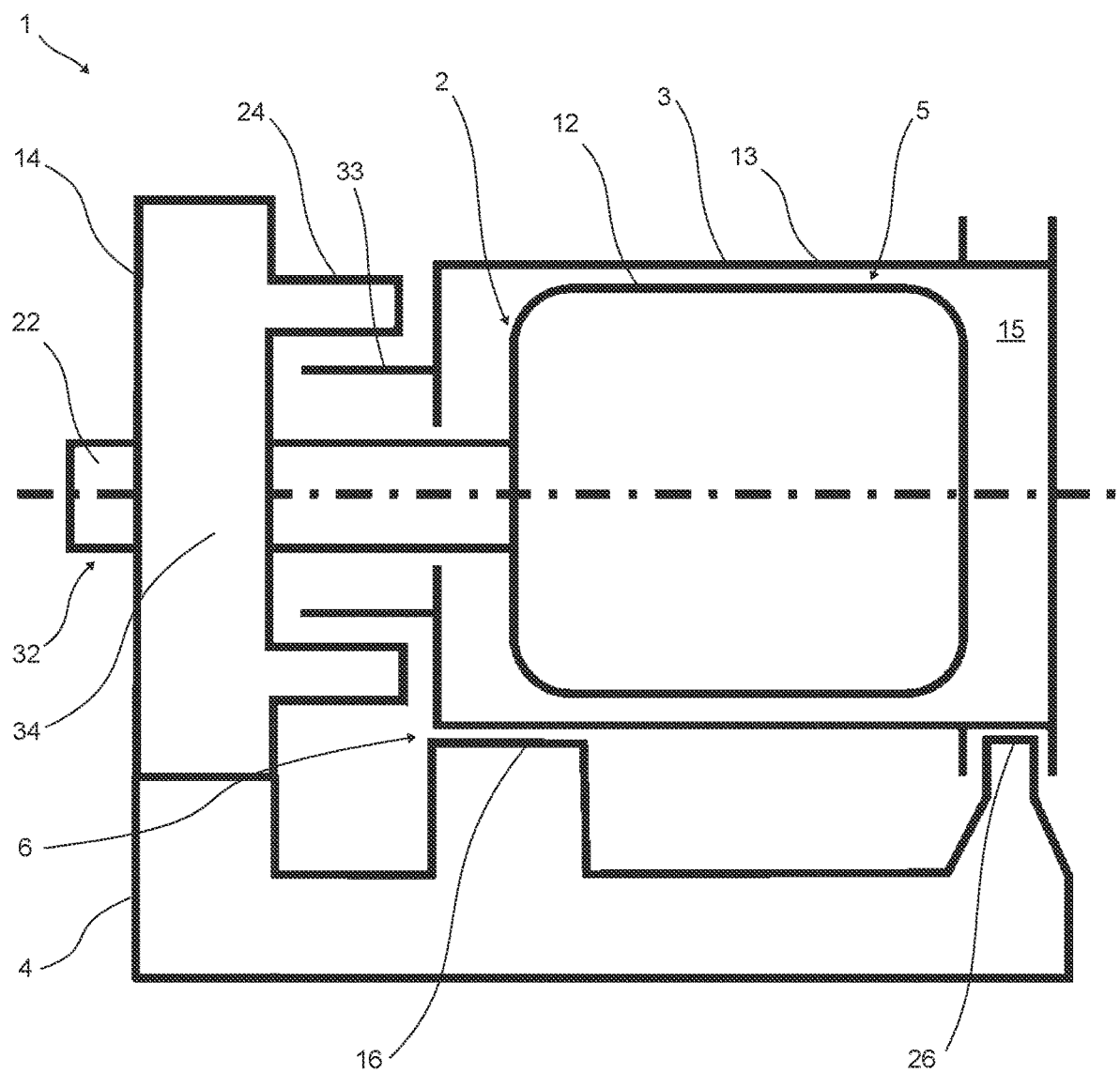

FIG. 4 shows the control device 1 presented with reference to FIG. 2 with an alternative arrangement of shaft holder 14 and rotor unit 3. Here, the shaft holder with its portion 24 surrounds a radial outer side of the rotor unit 3 formed as an extension 33. In addition to the previously discussed advantages, such a design offers particularly small radial dimensions.

Here, both bearing units 16, 26 are arranged directly on the support body 4. Alternatively or additionally, however, a mounting can also be provided on the extension 33.

Figure 5:
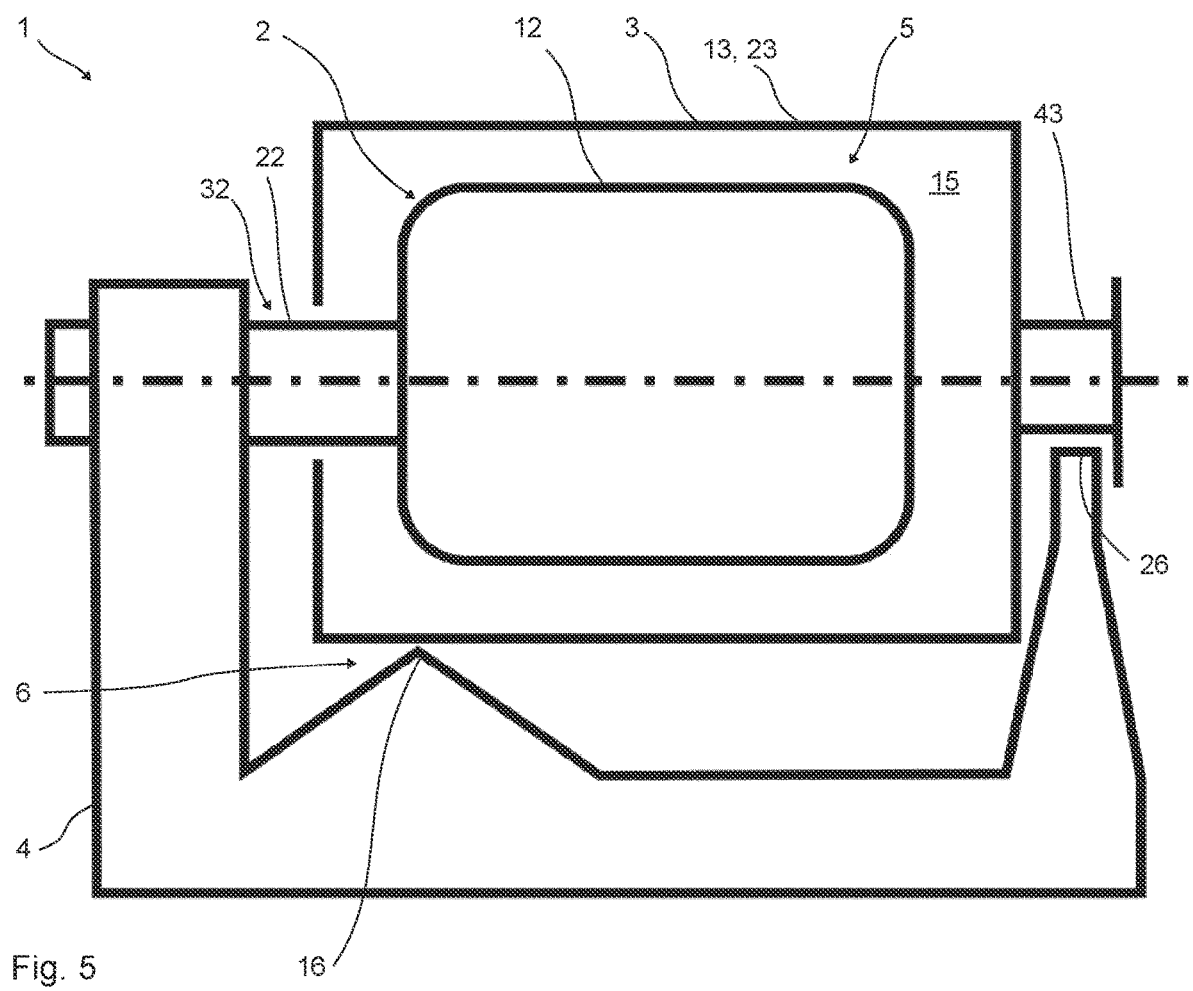

In FIG. 5, the control device 1 presented with reference to FIG. 1 is shown with an alternative bearing arrangement. Here, the rotor unit 3 has, at one axial end, an extension 43, on which the bearing unit 26 is arranged. Depending on the available installation space, this design has advantages.

With reference to FIGS. 6 to 10, an exemplary embodiment of the control device 1 according to the invention is now described, as can be used particularly advantageously in a computer mouse 100.

The support body 4 is designed here in such a way that sufficient space is available to be able to equip the rotor unit 3 with a circumferential ring or the like for the mouse wheel 23.

Figure 6:
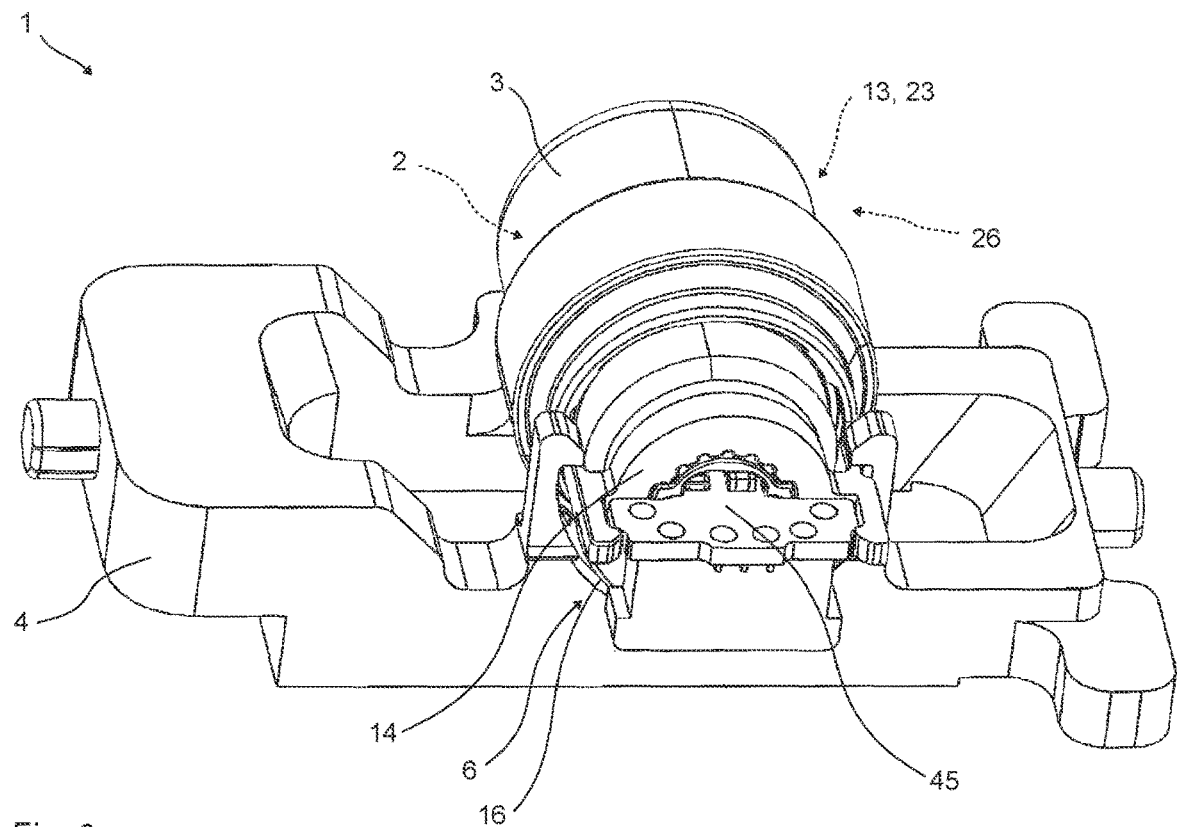
FIG. 6 shows a purely schematic illustration of a further control device according to the invention in a perspective view.

FIG. 6 shows a perspective view of the control unit 1. The stator unit 2 is not visibly covered by other components here. Only an electronic unit (PCB and connector) 45 of the braking device 5 is visible here. The shaft holder 14 is fastened or clipped to the support body 4 here. In the illustration shown here, only the bearing unit 16 of the bearing device 6 is visible. The other bearing unit 26 is not visible here and is arranged behind the rotor unit 3.

Figure 7:
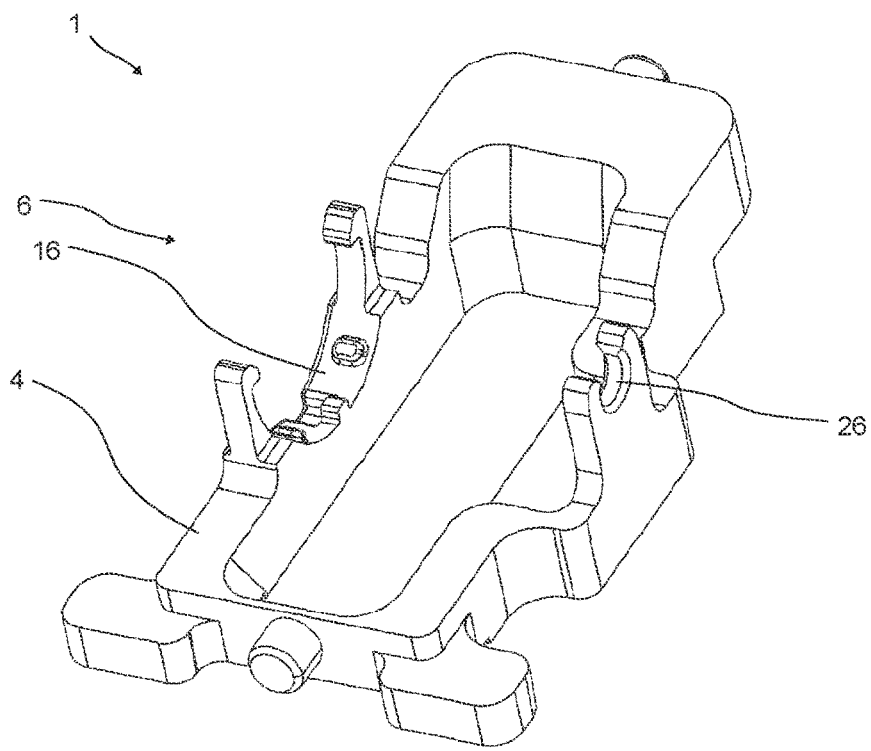
FIG. 7 shows a detailed illustration of the control device of FIG. 6 in a perspective view.

FIG. 7 shows the support body 4 of the control device 1 of FIG. 6. The support body 4 is designed here as a one-piece molded part made of plastic, for example. The bearing units 16, 26 or their receiving areas are clearly visible here. One or more plain bearings or roller bearings can be arranged on such receiving areas, for example. The receiving areas can also provide the respective bearing units 16, 26 themselves, at least partially.

Figure 8:
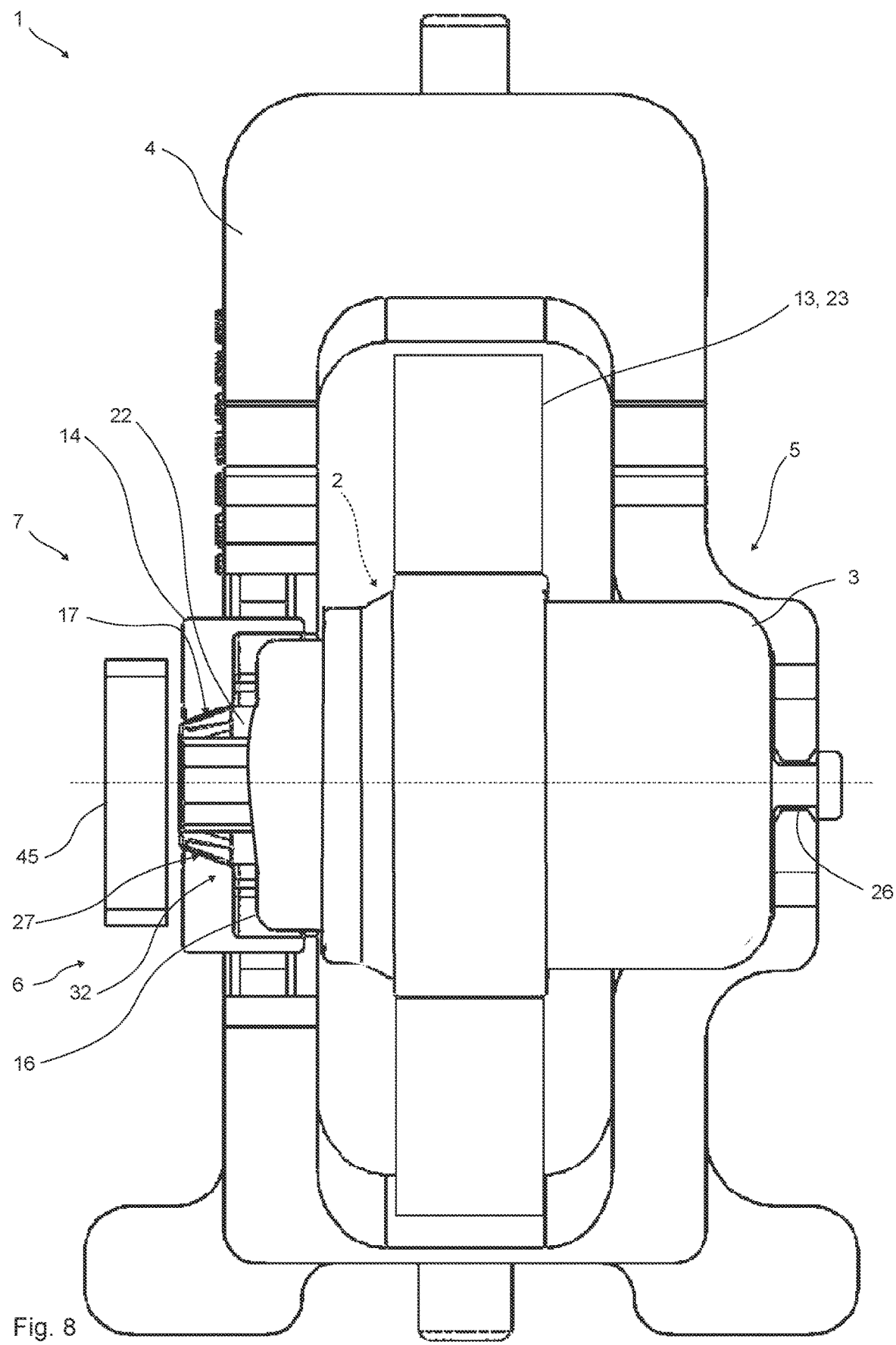
FIG. 8 shows the control device of FIG. 6 in a partially sectioned plan view.

FIG. 8 shows a partially sectioned plan view of the control device 1 of FIG. 6. To provide the mouse wheel 23, the rotor unit 3 is equipped here with a roughly sketched circumferential ring. In the sectional view shown here, the conical alignment portion 17 of the stator shaft 22 and the associated alignment part 27 in the shaft holder 14 are clearly visible.

Figure 9:
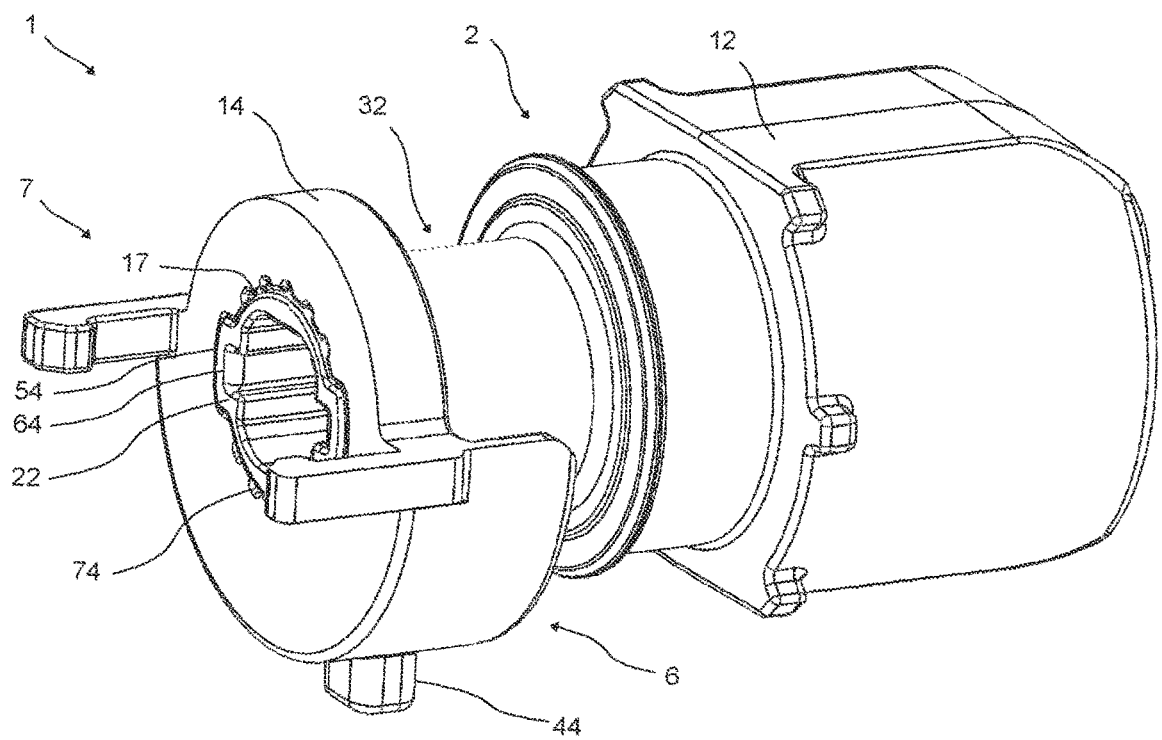
FIG. 9 shows a detailed illustration of the control device of FIG. 6 in a perspective view.
Figure 10:
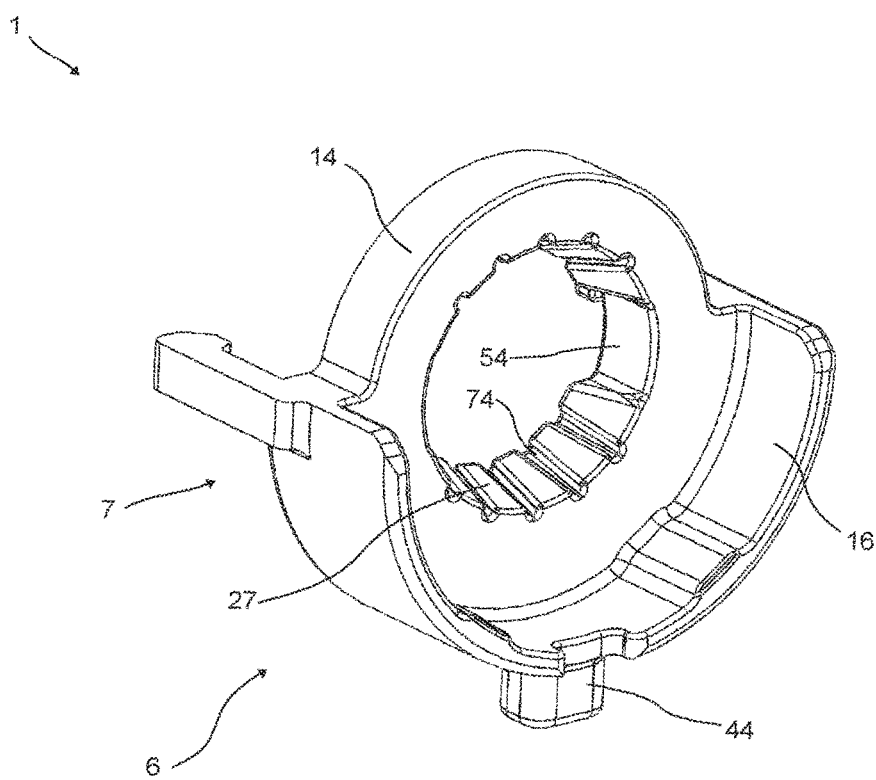
FIG. 10 shows a further detailed illustration of the control device of FIG. 6 in a perspective view.

FIG. 9 shows the stator unit 2 together with the shaft holder 14. The rotor unit 3 is not shown here for clarity. In FIG. 10, the shaft holder 14 is shown alone. Thus, the alignment device 7 with the alignment portion 17 of the stator shaft 22 and the alignment part 27 in the shaft holder 14 can be clearly seen here. Also clearly visible here is the radially inner receiving area of the shaft holder for the bearing unit 16. For example, one or two or more bearing points of the bearing unit 16 may be there.

The shaft holder 14 is equipped here with a pin 44 to allow a rotationally fixed connection to the support body 4 (the reaction torque is derived via this). The shaft holder 14 here also has two grooves 54 in the receiving area for the stator shaft 22. The grooves 54 serve to hold the stator shaft 22 in a rotationally fixed manner. For this purpose, the stator shaft 22 has two corresponding projections 64 which engage in the grooves 54. In addition, the shaft holder 14 here has adhesive grooves 74 for receiving or distributing an adhesive. The adhesive is used to adhesively bond the stator shaft 22 to the shaft holder 14.

LIST OF REFERENCE SIGNS 1 control device
2 stator unit
3 rotor unit
4 support body
5 braking device
6 bearing device
7 alignment device
12 stator body
13 control wheel
14 shaft holder
15 chamber
16 bearing unit
17 alignment portion
22 stator shaft
23 mouse wheel
24 portion
25 magnetic-field-generating device
26 bearing unit
27 alignment part
32 stator connection
33 extension
34 portion
35 volume compensation
36 fixed bearing
43 extension
44 pin
45 electronics unit
46 travel limitation means
54 groove
64 elevation
74 adhesive groove
100 computer mouse
101 mouse body
102 mouse button
103 mouse button

The invention claimed is:

1. A control device comprising:
a stator unit fastened to a support body at a stator connection;
a rotor unit rotatable about said stator unit, a rotatability of said rotor unit about said stator unit being configured to be influenced by a braking device;
a bearing unit of a bearing device mounting said rotor unit on said support body for the rotatability about said stator unit, wherein a force acting on said rotor unit from radially outside can be diverted via said bearing unit into said support body, bypassing said stator unit and said stator connection.

2. The control device according to claim 1, wherein said rotor unit is mounted on said support body radially outwardly via said bearing unit.

3. The control device according to claim 1, wherein said bearing unit is arranged on a radial outer side of said rotor unit.

4. The control device according to claim 1, wherein said rotor unit is at least partially arranged between said bearing unit and said stator unit.

5. The control device according to claim 1, wherein said bearing unit surrounds said rotor unit only partially radially.

6. The control device according to claim 1, wherein said bearing unit radially surrounds said rotor unit in a form fitting manner, and said bearing unit is configured to prevent said rotor unit from leaving said bearing unit in a radial direction.

7. The control device according to claim 1, wherein said rotor unit is mounted on said support body only with a radial portion of its circumference.

8. The control device according to claim 1, wherein said rotor unit is not mounted on said stator unit and preferably only on said support body.

9. The control device according to claim 8, wherein said rotor unit is axially displaceably mounted on said support body.

10. The control device according to claim 1, wherein said bearing unit provides a fixed bearing for blocking an axial movability of said rotor unit, and/or wherein said bearing unit has a travel limiter configured for limiting an axial movability of said rotor unit in at least one direction.

11. The control device according to claim 1, wherein said stator unit and said rotor unit delimit a chamber that is sealed outwardly, and wherein a braking medium of said braking device is arranged in said chamber.

12. The control device according to claim 11, wherein
said stator unit extends out of said chamber,
said stator unit is moveable partially out of or into said chamber,
a volume of said chamber available for said braking medium is variable by moving said stator unit out or in, in order to provide compensation for temperature related and/or leakage related and/or assembly related changes in said volume of said braking medium.

13. The control device according to claim 1, wherein said stator unit and said rotor unit are axially displaceable relative to each other.

14. The control device according to claim 1, wherein said stator unit is arranged axially displaceably on said support body.

15. The control device according to claim 1, wherein said stator unit, is arranged on said support body via a shaft holder.

16. The control device according to claim 15, wherein
said stator unit is arranged in a rotationally fixed manner on said shaft holder,
said shaft holder is arranged axially displaceably on said support body, and
said shaft holder surrounds said rotor unit radially at least in portions.

17. The control device according to claim 1, wherein said rotor unit is mounted axially displaceably on said support body.

18. The control device according to claim 1, wherein said stator unit is only fastened to said support body on one side.

19. The control device according to claim 1, further comprising an alignment device configured for aligning an axial center axis of said stator unit relative to an axial center axis or axis of rotation of said rotor unit.

20. The control device according to claim 19, wherein a stator shaft of said stator unit can be aligned on said shaft holder by said alignment device.

21. The control device according to claim 20, wherein said stator shaft comprises a conical alignment portion arranged in and/or on a corresponding conical alignment part of said shaft holder.

22. The control device according to claim 20, wherein said shaft holder is configured to be aligned on said support body by said alignment device and/or said rotor unit is configured to be aligned on said shaft holder by said alignment device.

23. The control device according to claim 22, wherein
said shaft holder is configured to be at least partially axis symmetrical; and
an axial center axis of a portion of said shaft holder, radially surrounding said rotor unit, and an axial center axis of a portion of said shaft holder to which said stator unit is fastened, are arranged in parallel.

24. The control device according to claim 23, wherein said rotor unit is rotatably mounted on said portion of said shaft holder that radially surrounds said rotor unit.

25. The control device according to claim 23, wherein a portion of said shaft holder radially surrounding said rotor unit, has an outer side at least partially in said support body and in a rotationally fixed manner.

26. The control device according to claim 1, wherein a deceleration torque occurring during a deceleration of a rotary motion of said rotor unit can be diverted into said support body via said stator unit.

27. The control device according to claim 1, wherein a pressure load exerted on said rotor unit during a control operation can be diverted into said support body at least via said bearing unit, bypassing said stator unit.

28. The control device according to claim 1, wherein said bearing device comprises a further bearing unit, and said rotor unit is mounted on said support body via said further bearing unit.

29. The control device according to claim 28, wherein said bearing unit and said further bearing unit of said bearing device are arranged axially spaced from each other, and said rotor unit is mounted radially outwardly on said support body for said rotatability of said rotor unit about said stator unit via said bearing unit and said further bearing unit.

30. The control device according to claim 1, wherein said bearing device is configured for one sided clamping of said rotor unit to said support body.

31. The control device according to claim 1, wherein said braking device is magnetorheological and comprises at least one magnetorheological medium which is configured to be influenced by a controllable magnetic field generating device, and said rotatability of said rotor unit about said stator unit is configured to be decelerated by said medium.

32. The control device according to claim 31, wherein
said magnetorheological medium comprises particles that can be influenced in a targeted manner by a magnetic field,
said particles are contained in a carrier medium, and
said carrier medium is provided by ambient air and/or a fluid that differs from ambient air.

33. The control device according to claim 32, wherein said particles are selected from the group consisting of ferromagnetic particles, ferrimagnetic, and superparamagnetic particles.

34. The control device according to claim 1, wherein said rotor unit comprises a control wheel.

35. A computer mouse comprising at least one control device according to claim 1.

36. A motor vehicle steering wheel comprising at least one control device according to claim 1.

* * * * *